United States Patent [19]

Coussau et al.

[11] Patent Number: 4,585,612
[45] Date of Patent: Apr. 29, 1986

[54] DEVICE FOR CHECKING THE DISCONNEXION OF THE CONTROL CLUSTERS OF A NUCLEAR REACTOR

[75] Inventors: Jean Coussau, Paris; Hubert Genton, Lyons, both of France

[73] Assignee: Framatome & Cie, Courbevoie, France

[21] Appl. No.: 501,356

[22] Filed: Jun. 6, 1983

[30] Foreign Application Priority Data

Jul. 1, 1982 [FR] France .................. 82 11576

[51] Int. Cl.$^4$ .................................. G21C 19/10
[52] U.S. Cl. .................................. 376/260; 294/906
[58] Field of Search ............ 294/86 A; 376/233, 258, 376/260, 268, 271

[56] References Cited

U.S. PATENT DOCUMENTS

| | | | |
|---|---|---|---|
| 4,244,616 | 1/1981 | Buchalet | 294/86 A |
| 4,308,100 | 12/1981 | Albin | 376/268 |
| 4,382,711 | 5/1983 | Lafosse et al. | 376/233 |

FOREIGN PATENT DOCUMENTS

| | | | |
|---|---|---|---|
| 2635501 | 2/1978 | Fed. Rep. of Germany | 376/258 |
| 0852762 | 8/1981 | U.S.S.R. | 294/86 A |

*Primary Examiner*—Deborah L. Kyle
*Assistant Examiner*—Richard W. Wendtland
*Attorney, Agent, or Firm*—Pollock, Vande Sande & Priddy

[57] ABSTRACT

The subject of the invention is a device for checking the disconnexion of the actuating rods of the control clusters before the removal of the internal equipment of a nuclear reactor, comprising, within a pit (10) forming a cooling pond, a vessel (1) closed by a removable cover and containing the core and a set of control clusters fitted slidably in the upper internal equipment forming a guide structure above the core, each cluster being fixed to the lower part (32) of an actuating rod (3) capable of being detached from the corresponding cluster, after opening the cover, by means of a disconnecting tool suspended from a charging crane (2) transportable above the cooling pond (10).

The checking device according to the invention comprises a pole (4) of greater length than the distance between the platform and the level of the heads of the actuating rods, fitted at its upper part with means (44) for suspending and actuating the rotation of the pole about its vertical axis, and at its lower part with a bushing (5) for centering at a given level on the head of the actuating rod (3) and with an arm (7) extending transversely to the horizontal at the level of the heads (39) of the disconnected rods and of greater length than the distance between the axes of the clusters.

5 Claims, 6 Drawing Figures

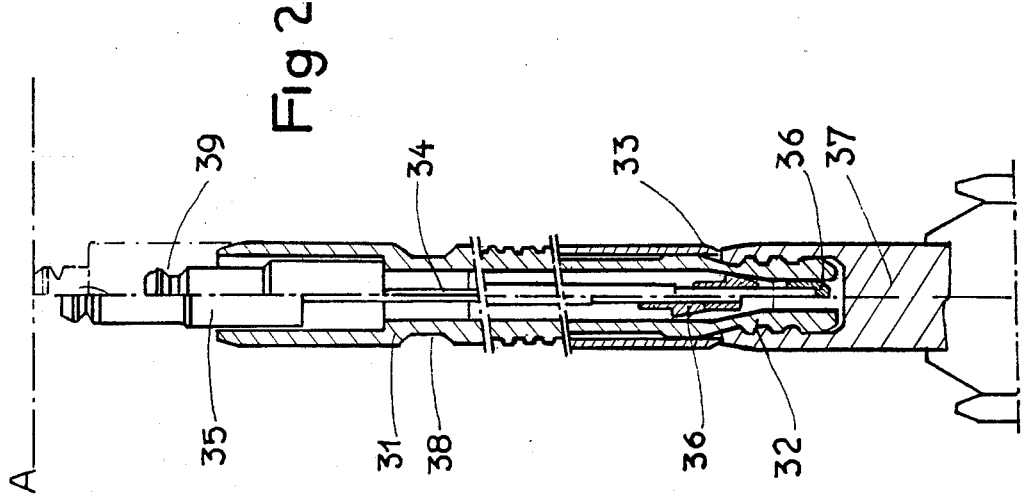
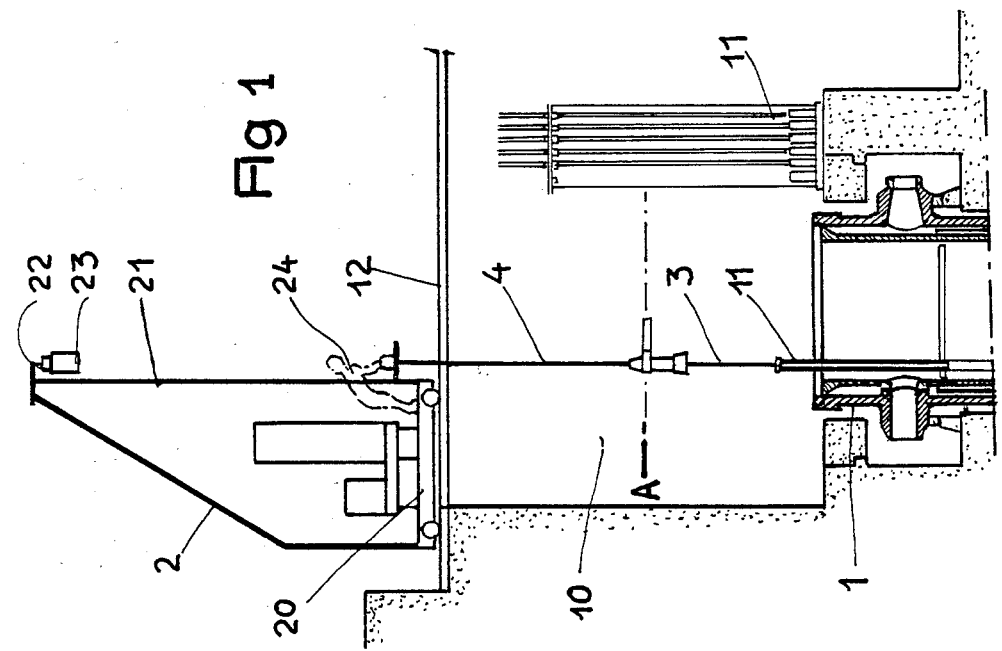

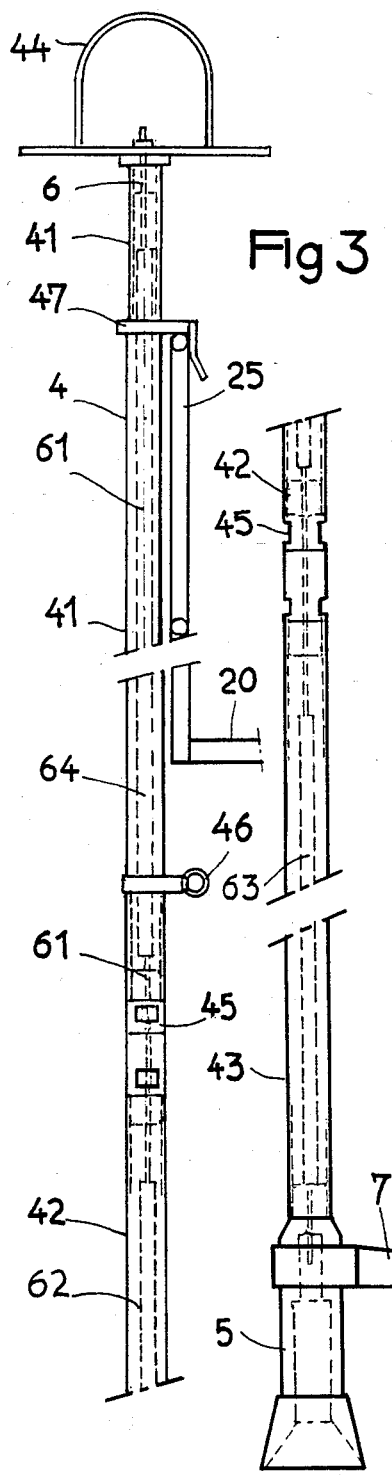
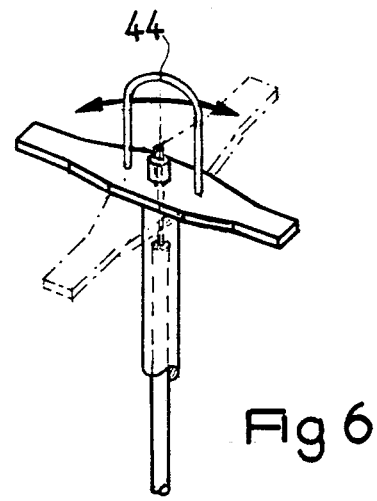
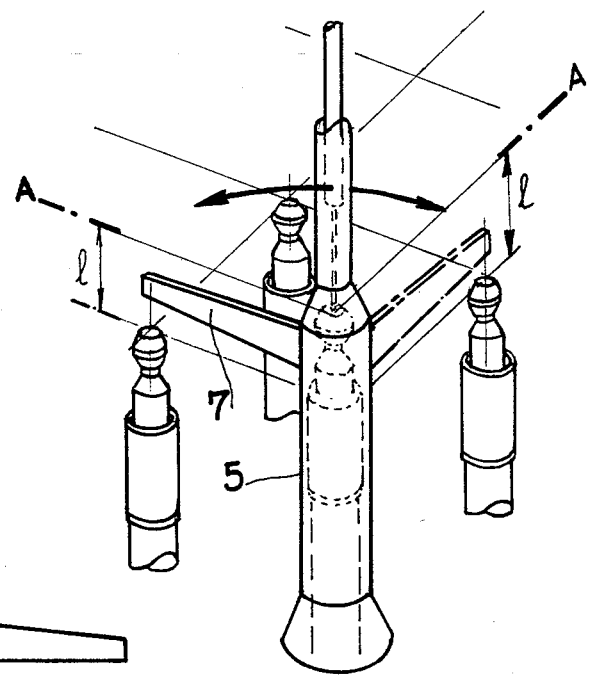

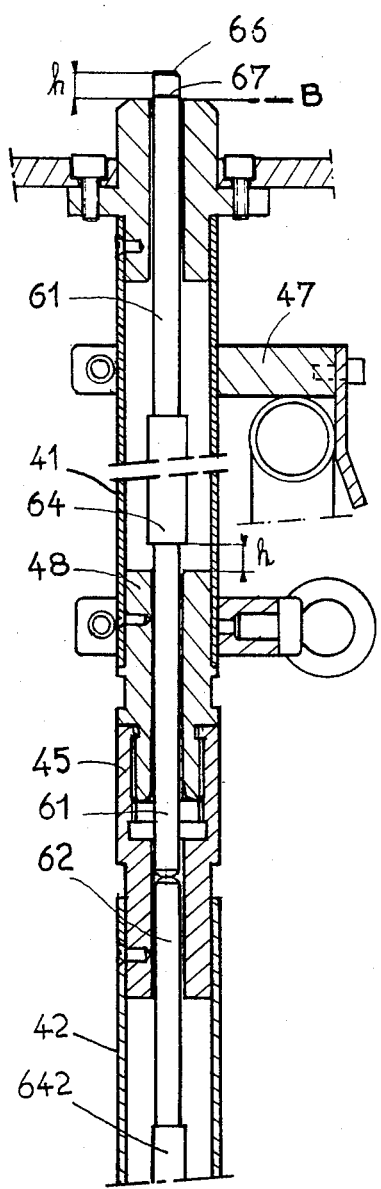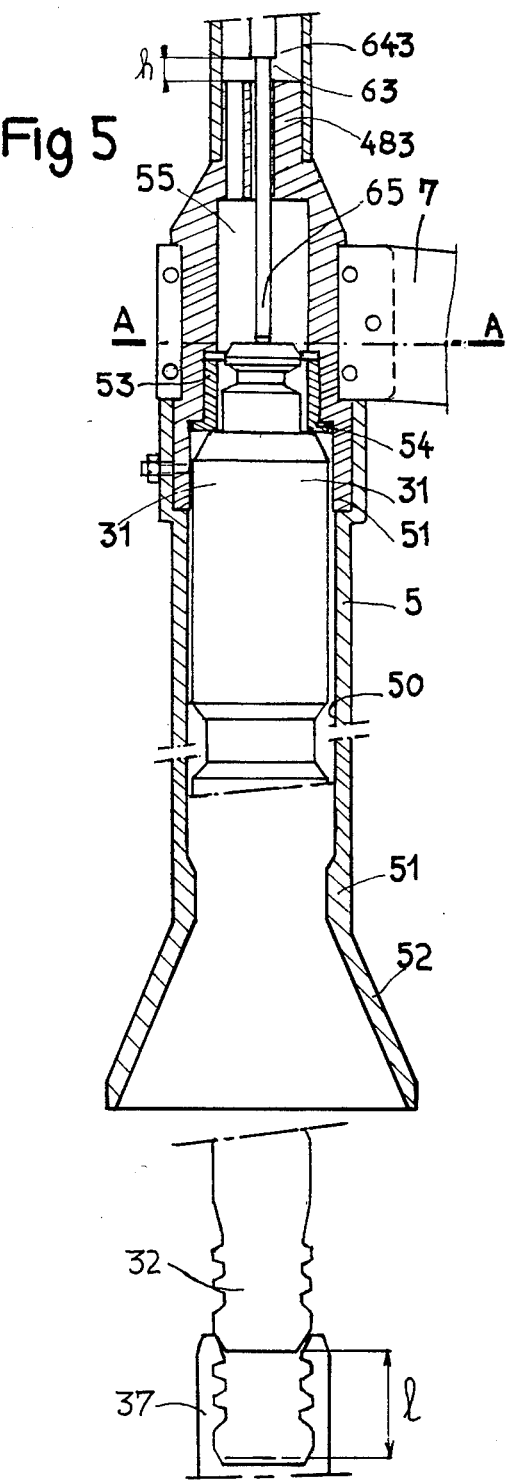

DEVICE FOR CHECKING THE DISCONNEXION OF THE CONTROL CLUSTERS OF A NUCLEAR REACTOR

FIELD OF THE INVENTION

The subject of the invention is a device for checking the disconnexion of the actuating rods of the control clusters of a nuclear reactor before the removal of the internal equipment.

A nuclear reactor, particularly of the pressurized water type, comprises, within a pit forming a cooling pond, a vessel closed by a removable cover and containing the core. Clusters of control rods, which can be moved vertically in order to control the operation of the reactor, are placed within the core. For this purpose, these clusters slide in guide columns forming, above the core, a structure generally called the upper internal equipment, which rises as far as the level of the opening plane of the vessel, the latter being closed by a removable cover. The movement of each cluster is actuated individually by an actuating rod fixed by its lower part to a fixing head of the cluster, which penetrates the cover, passing through an adaptor tube fixed to the latter. Raising and lowering mechanisms for the rod, which are fitted on the adaptor tube, are placed within a fluid-tight housing prolonged upwards by a sleeve closed at its upper part, in which the actuating rod can slide.

When it is proposed to undertake recharging with fuel or any operation of inspection within the core, it is necessary not only to open the cover, but also to remove the upper internal equipment in order to reach the core which is located beneath.

Obviously, in order to shut down the reactor, the control clusters have all been lowered into the position of maximum insertion in the reactor, the fixing heads of the clusters then being slightly above the core top plate. In this position, the actuating rods which surmount the clusters remain guided in the upper internal equipment and pass into the adaptor tubes, their heads being slightly above the level of the actuating mechanisms.

When it is proposed to open the core, after having filled the cooling pond, depressurized the core and substantially cooled it to ambient conditions, the antiprojectile slabs are removed, then a certain number of units of the equipment are dismantled, such as for example the ventilation sheaths of the mechanisms of the control clusters and the lagging of the flange of the vessel. Then the dismantling operations can be performed, for example by means of the charging crane which consists of a platform transportable on rails above the vessel. A boom which is fitted on this platform comprises at its upper part a monorail equipped with a winch which can thus move so as to occupy a precise position above the core, and particularly be centered in the axis of an actuating rod.

The removal of the cover can then be proceeded with. The top plate of the internal equipment is located substantially at the level of the opening plane. The actuating rods, which rise vertically above the top plate, are maintained in the internal equipment and withdrawn at the same time as the latter. Since each actuating rod is connected to a cluster by its lower end, it is therefore necessary first of all to proceed to disconnect all the actuating rods before withdrawing the internal equipment.

A disconnecting tool which is carried by the charging crane is used for this purpose.

PRIOR ART

The actuating rod generally comprises a tubular sleeve within which an axial rod is fitted slidably and fixed by its upper part to a fixing head which protrudes above the tubular sleeve. The outer wall of the latter is notched on its greater part to permit the hooking of the actuating mechanisms. Moreover, the lower end of the sleeve consists of a plurality of pawls capable of separating and closing together radially, which constitute a fixing mandrel on the claw. For this purpose the inner walls of the pawls form towards the interior a hollow conical part in which a bob fixed to the lower end of the axial rod can engage. A spring supported against the tubular sleeve and against a stop of the axial rod pushes the latter downwards, making the bob penetrate between the fixing pawls so as to separate the latter counter to the action of springs which tend, on the contrary, to close them together when the bob is withdrawn.

The disconnecting tool is placed at the lower part of a vertical rod suspended from the charging crane and comprises two sliding parts capable of hooking, the one on the tubular sleeve and the other on the fixing head of the actuating rod. It is therefore possible, by sliding the two parts of the tool, to raise the bob in order to allow the fixing pawls to tighten, or to lower it in order to separate the pawls.

Moreover, the fixing head of each control cluster consists of a hollow bushing into which the lower end of the actuating rod can penetrate when the pawls are tightened. The latter are fitted externally with notches which, when the bob is raised, engage into corresponding grooves made on the inner wall of the bushing. The connexion or the disconnexion of each actuating rod with the corresponding cluster can be effected in this way.

After the vessel has been opened, the operator, stationed on the charging crane from which the disconnecting tool is suspended, positions the latter successively over the actuating rods in order to disconnect them one by one. After having actuated the tightening of the fixing pawls, he raises the rod and the sleeve in order to withdraw the pawls from the bushing, then separates the pawls afresh and lowers the rod and the sleeve again until its lower end rests upon the upper part of the bushing, without penetrating it.

At the end of the operation, all the actuating rods have therefore been disconnected and simply placed on the fixing heads of the corresponding clusters. It is then possible to withdraw the internal equipment with the actuating rods, the control clusters remaining in position.

It is imperative that one must be absolutely certain of the disconnexion of all the actuating rods. It is in fact difficult, at the time of raising the internal equipment, to know whether one is at the same time raising a cluster which has accidentally remained hooked. Now, if the latter is withdrawn from the core, it is extremely difficult afterwards to replace it inside the core. This is why it is necessary, before removing the internal equipment, to check that all the actuating rods have in fact been disconnected.

Dynamometers or weighing devices may be placed on the rods for this purpose, but the measurements obtained may be subject to errors.

SUMMARY OF THE INVENTION

The subject of the invention is a very simple device which makes it possible, without prolonging the handling time, to check that all the actuating rods have in fact been disconnected so as to be certain that the internal equipment can be raised without danger of entraining a control cluster.

The device according to the invention comprises a pole of greater length than the distance between the platform and the level of the heads of the actuating rods, fitted at its upper part with means of suspending and actuating the rotation of the pole about its vertical axis, and at its lower part with a bushing for centering at a given level on the head of the actuating rod and, at the same level, with an arm extending transversely to the horizontal at the level of the heads of the rods and of greater length than the distance between the axes of the clusters. The centering bushing is fitted with an internal stop capable of coming to bear against a part of the actuating rod located at a given level with reference to the upper end of the rod.

In a preferred embodiment, the device comprises a means for checking the level of the pole with reference to the head of the actuating rod, consisting of a gage rod fitted slidably in the axis of the pole and bearing downwards against a stop made on the pole so that its lower end extends inwards and in the axis of the guide sleeve to a level corresponding to a given insertion of the head of the actuating rod into the centering bushing.

BRIEF DESCRIPTION OF THE DRAWINGS

The invention will now be described with reference to a particular embodiment given by way of example and illustrated in the accompanying drawings.

FIG. 1 shows schematically the cooling pond surmounting the well of the vessel, the charging crane and the disconnecting tool.

FIG. 2 illustrates the operation of an actuating rod of conventional type.

FIG. 3 shows in elevation the checking device, in two views juxtaposed.

FIG. 4 and FIG. 5 are detail views, in axial section, of the upper part and of the lower part of the device respectively.

FIG. 6 is a diagram illustrating the operation of the device in perspective.

DETAILED DESCRIPTION

FIG. 1 illustrates the upper part of the vessel 1 of the reactor, the cover being removed. The water-filled cooling pond 10, in which a tool storage rack 11 has been placed, is located above the reactor.

Rails 12 upon which the charging crane 2 can be transported are placed above the water. This crane consists of a platform 20 and of a boom 21, to the upper part of which is attached a monorail 22 supporting a winch 23 which can be transported on the monorail perpendicularly to the direction of transport of the platform 20 on the rails 12. It is thus possible, by perpendicular movements, to position the winch 23 above any point of the vessel, the monorail 22 covering the total width of the latter.

The movements of the platform and of the monorail are actuated by an operator 24 stationed on the platform.

The internal equipment, of which a single guide tube 11 containing an actuating rod 3 has been illustrated, is located inside the vessel 1.

The actuating rod is of the known type which is illustrated in FIG. 2.

As indicated above, the actuating rod 3 consists of a tubular sleeve 31, the lower end of which carries a plurality of fixing pawls 32 which delimit an internal space 33 in the shape of a hollow cone. Within the sleeve 31 there is located an axial rod 34, the upper end of which is fixed to the head 35 of the actuating rod, and which carries at its lower end a bob 36 capable of separating the fixing pawls 32 by descending into the conical space 33 by the action of a spring not shown. Thus, the control cluster being fitted with a fixing head 37 in the shape of a hollow bushing into which the pawls 32 of the actuating rod penetrate, the separation of them by the bob 36 produces the firm attachment of the actuating rod 3 to the fixing head 37 of the cluster.

In order to disconnect the actuating rod, therefore, a tool is used which bears against grooves 38 and 39 made respectively on the outer sleeve 31 and on the head 35 of the actuating rod. By sliding the head 35 upwards whilst maintaining the sleeve 31, as illustrated in the left-hand half of the figure, the bob 36 rises above the conical part 33 and permits the pawls 32 to tighten. If the actuating rod is then raised, it withdraws from the bushing 37. In this position, the bob 36 is lowered again by the action of the spring, and separates the pawls 32 once more and the actuating rod 3 is lowered again until its lower end rests upon the upper part of the fixing head 37.

When these operations have been performed on all the actuating rods, the upper ends of the latter are normally located at the same level A indicated in the figures. The checking tool is manipulated manually by the operator who is stationed on the platform of the charging crane.

The checking device consists essentially of a pole of great length preferably consisting of three parts coupled end to end 41, 42, 43 which have been illustrated side by side in FIG. 3.

The upper part therefore consists of a first pole element 41 fitted at its upper part with an actuating yoke 44 and at its lower part with a coupling means 45 to the central part 42. The appliance is held by the operator and also retained by a safety line fixed to a hoisting ring 46, itself fixed by a collar to the pole 41 at an adequate level, and it is advantageous also to provide a hooking collar 47 permitting the device to be placed on the hand-rail 25 of the charging crane when it is not in use, so as to keep the device within reach in order to make the check after each disconnexion of an actuating rod. The central part 42 is likewise fitted at both its ends with coupling elements 45 for the lower end of the upper part 41 and for the upper end of the lower part 43 respectively. The latter is terminated at its lower end by a centering bushing 5 illustrated in detail in FIG. 5.

The centering bushing 5 consists essentially of a tube, the inner wall 50 of which comprises at its upper and lower ends two centering shoulders 51 of substantially equal diameter to the outer diameter of the sleeve 31 of the actuating rod. The centering bushing 5 is also prolonged at its lower part by a flared end 52 which permits the pole to be threaded onto the actuating rod, the approximate positioning having been performed visually by the operator 24.

The height of the centering bushing 5 being threaded onto the actuating rod is sufficient to ensure that the checking device is vertical when it is in position.

A stop 53 which is located at the upper part of the centering bushing 5 consists of a bushing of slightly greater diameter than that of the head 35 of the actuating rod, its lower part consisting of a flange 54 which comes into abutment against the upper edge of the sleeve 35 of the actuating rod 3. In this position the head 35 of the actuating rod therefore penetrates inside the centering bushing to the level A which is fixed with reference to the centering bushing by the flange 54.

As illustrated in FIG. 4, the couplings 45 may be simple screw joints.

Although the level of the device with reference to the actuating rod is fixed by the stop 54, it is advantageous to check this level by means of a gage rod 6 extending in the axis of the pole 4 and likewise consisting of three elements 61, 62, 63 corresponding to the elements 41, 42, 43 of the pole. As FIG. 4 shows, each element of the gage rod such as 61 comprises a widened part 64 forming at its base a shoulder which comes into abutment against the lower end 48 of the pole above the coupling 45. Beneath this shoulder the gage rod has a narrower cross-section and slides within an orifice made in the lower end 48 to below the level of the coupling 45, where it abuts the upper end of the central gage rod 62. The latter is constituted in the same way, as is the lower gage rod 63 which likewise has a shoulder 643 coming into abutment against the lower end 483 of the lower pole 43, above the centering bushing 5. The lower end 65 of the lower gage rod 63 penetrates into the central space 55 of the centering bushing 5 to a level below the level A normally occupied by the head 35 of the actuating rod when the device is threaded onto the latter. Consequently, when the device is in place, the stop 54 bearing upon the sleeve 31, the three elements of the gage rod are raised by a height h by which the upper end 66 of the gage rod 61 projects above the top level B of the device, as illustrated in FIG. 4. It is possible, for example, to place a reference mark 67 on the upper end 66 of the gage rod 61 so as to check the relative height of the body 31 of the actuating rod with reference to the fixing head 35.

Lastly, the device comprises at its lower part an arm 7 which is fixed to the lower end of the pole 4, above the centering bushing 5, so as to extend transversely substantially to the level of the head of the rod being checked. The operation of the device, illustrated particularly by FIG. 6, is therefore as follows:

After having disconnected and raised the first actuating rod by means of the disconnecting tool, so that its lower end rests upon the fixing head 37 of the corresponding cluster, the checking device 4 which has just been described is positioned manually. The device is lowered and the centering bushing 5 is threaded onto the actuating rod until it comes into abutment against the body 31 of the latter in the position illustrated in FIG. 5. Normally the actuating rod is the only one disconnected and is therefore at the level A whereas all the other rods are at a lower level since they are inserted into the fixing head of length 1 (FIG. 5). The operator 24 then manually rotates the device about its axis so that the arm 7 describes a circle. The checking operation is performed whilst preparing the disconnexion of the next cluster.

If the actuating rod being checked is in fact disconnected, the arm 7 should not encounter any obstacle, since all the other rods are in the bottom position. The device is then hooked to the hand-rail by the hook 47.

The checking of each rod after disconnecting it is thus continued, obviously proceeding in a given order so as to mark the position of each rod checked to allow for the possible play of the transverse arm with reference to the other rods already disconnected.

Thus, step by step, the disconnexion of each rod can be checked one after the other, and it can be ensured that there is no danger of entraining a cluster in raising the internal equipment. The checking device, which is not subjected to any force, may be made of aluminum and consequently light enough to be manipulated manually by the operator. This means that the duration of the rod disconnection operation is not prolonged by this checking.

The invention is of course not limited to the details of the embodiment which has just been described, which could be modified by the use of equivalent means or indeed by improved. Likewise, other modes of using the checking device are imaginable, for example in order to perform the checking by groups of rods and not rod by rod, as has just been described.

We claim:

1. A device for checking the disconnexion of the actuating rods of the control clusters before the removal of the internal equipment of a nuclear reactor comprising, within a pit (10) forming a cooling pond, a vessel (1) closed by a removable cover and containing a core, a set of control clusters fitted individually vertically slidably in upper internal equipment forming a guide structure above the core, each cluster being fitted at its upper part with a removable fixing head (37) on the lower part (32) of an actuating rod (3) penetrating the cover upon which is supported a raising and lowering mechanism of the rod fitted slidably in a guide sleeve, said vessel (1) being able to be opened after shutdown of the reactor caused by lowering of the control clusters into a bottom position, the mechanism and the guide sleeves being removed first with the cover, then the actuating rods (3) disconnected one by one by means of a disconnecting tool suspended from a charging crane (2) consisting of a platform (20) transportable above the cooling pond (10) and fitted with a tool suspension member (23) and with means (22) for positioning the suspended tool vertically above each of the rods (3), which comprises a pole (4) of greater length then the distance between the platform and the level of the heads of the actuating rods, fitted at its upper part with means (44) of suspending and actuating the rotation of the pole about its vertical axis, and at its lower part with a bushing (5) for centering at a given level on the head of the actuating rod (3) and with an arm (7) extending transversely to the horizontal at the level of the heads (32) of the disconnected rods and of greater length then the distance between the axes of the clusters.

2. A device for checking as claimed in claim 1, wherein the centering bushing (5) is fitted with an internal stop (54) capable of coming to bear upon a part (31) of the actuating rod (3) located at a given level with reference to the upper end of the rod (3).

3. A device for checking as claimed in claim 1, which comprises a means for checking the level of the pole (4) with reference to the head of the actuating rod (3), consisting of a gage rod (6) fitted slidably in the axis of the pole (4) and bearing downwards against a stop (48, 483) made on the pole (4) so that its lower end extends inwards and in the axis of the centering bushing (5) to a level corresponding to a given insertion (h) of the head of the actuating rod (3) into the centering bushing (5).

4. A device for checking as claimed in claim 3, wherein the pole is composed of a plurality of elements (41, 42, 43) fixed one after the other by joint members (45) and wherein the level gage rod consists of the same number of elements (61, 62, 63) fitted slidably each in one of the pole elements, each gage rod element (61, 62, 63) bearing downwards against a stop (48) of the corresponding pole element and upwards against the lower end of the gage rod element (61, 62) placed above it.

5. A device for checking as claimed in any of the previous claims, wherein the checking pole assembly (4) consists of a strong light material and is manipulated manually by an operator stationed on the platform (20).

* * * * *